United States Patent [19]

Brock et al.

[11] Patent Number: 5,555,043
[45] Date of Patent: *Sep. 10, 1996

[54] MAGNETICS-ON-FILM IMAGE AREA RECORDING HEAD AND SUSPENSION SYSTEM

[75] Inventors: George W. Brock, La Jolla; Kent R. Gandola, Carlsbad; Wlodzimierz S. Czarnecki, Rancho Santa Fe, all of Calif.

[73] Assignee: Eastman Kodak Company, Rochester, N.Y.

[ * ] Notice: The term of this patent shall not extend beyond the expiration date of Pat. No. 5,555,044.

[21] Appl. No.: 346,997

[22] Filed: Nov. 30, 1994

[51] Int. Cl.⁶ .................................................. G03B 17/24
[52] U.S. Cl. ............................... 354/106; 360/3; 360/104
[58] Field of Search ...................................... 354/105, 106, 354/76; 360/1, 3, 104, 121

[56] References Cited

U.S. PATENT DOCUMENTS

| | | | |
|---|---|---|---|
| 4,669,016 | 5/1987 | Schmid et al. | 360/122 |
| 4,910,629 | 3/1990 | Mitsuhashi et al. | 360/121 |
| 5,146,378 | 9/1992 | Makino et al. | 360/121 |
| 5,321,452 | 6/1994 | Tsujimoto | 354/106 |
| 5,349,484 | 9/1994 | Koehler | 354/106 X |
| 5,450,149 | 9/1995 | Cocca | 354/106 |
| 5,469,313 | 11/1995 | Isozaki et al. | 354/106 |

*Primary Examiner*—A. A. Mathews
*Attorney, Agent, or Firm*—William F. Noval

[57] ABSTRACT

A photographic still camera for receiving an elongated filmstrip having a cross-film curvature and having a substantially transparent magnetic layer deposited on the film surface and for recording or reproducing information on or from the magnetic layer in relation to the exposure of image frames of the filmstrip. The filmstrip is transported from supply to takeup chambers between film rails and a backing plate past a camera image frame exposure aperture with the magnetic layer facing the backing plate and having a concave cross-film curvature across the image frame area. A magnetic recording multi-head array formed of a plurality of recording heads mounted on flexure elements of a flexure support is positioned to extend across and contact the magnetic layer in the image frame area at the side of the exposure aperture. Each flexure element includes an elongated, cantilever spring fixed at one end to the backing plate and terminating in a mounting platform having a gimbal mechanism for providing pitch and roll compliance with film motion and the cross-film concave curvature. Each magnetic recording head element is shaped with contoured profiles in the cross-film and film transport directions for ensuring compliance with the filmstrip magnetic layer during roll and pitch motions of the magnetic recording head without causing damage to the filmstrip.

16 Claims, 5 Drawing Sheets

MAGNETICS-ON-FILM IMAGE AREA RECORDING HEAD AND SUSPENSION SYSTEM

CROSS-REFERENCE TO RELATED APPLICATIONS

Reference is hereby made to commonly assigned, copending patent application Ser. Nos.: 08/335,532 filed Nov. 2, 1994, in the names of W. Stanley Czarnecki et al. and titled MAGNETICS-ON-FILM IMAGE AREA RECORDING HEAD AND INTERFACE;08/346,995 filed Nov. 30, 1994, in the names of G. William Brock et al. for MAGNETICS-ON-FILM IMAGE AREA RECORDING HEAD WITH FILM FLATTENING EMULSION SIDE SUPPORT; and 08/346,705, filed Nov. 30, 1994, in the names of Kent R. Gandola for MAGNETICS-ON-FILM IMAGE AREA RECORDING HEAD SUSPENSION SYSTEM.

FIELD OF THE INVENTION

This invention relates to magnetic recording and reproducing heads particularly for use for recording and reading information on a magnetics-on-film (MOF) layer in the image area of photographic filmstrips and particularly to the configuration and mounting of such recording heads on a suspension system to achieve high compliance with the relatively stiff filmstrip and MOF layer in cameras or other filmstrip handling apparatus.

BACKGROUND OF THE INVENTION

In commonly assigned U.S. Pat. Nos. 4,933,780, 4,977,419, 5,006,873, 5,025,283, and 5,276,472, a photographic filmstrip having a virtually transparent, magnetic film layer covering the nonemulsion side of the filmstrip (referred to as an MOF or magnetic layer) is disclosed in conjunction with various camera systems. Potential longitudinal recording tracks are illustrated in the MOF layer in both the image frame area and on either side of the image frame area for recording information such as film type, film speed, film exposure information and information relevant to the processing and subsequent use (e.g., printing) of the exposed image frames. The systems disclosed therein provide for recording of information during film manufacture, reading and/or recording of information on certain tracks during camera use, and reading and/or recording of printer related information during photofinishing. The information recorded during camera use may include voiced messages or sound associated with the photographed scene and may be recorded in digital or analog format on certain of the tracks.

The specific camera recording tracks and recording heads disclosed in the '419 and '780 patents are disposed to record in tracks located along the longitudinal edges of the film and outside the MOF layer in the image frame area. Further commonly assigned U.S. Pat. Nos. 5,034,836, 5,041,933, 5,274,522 and 5,285,324 and U.S. Pat. No. 5,307,100 disclose magnetic recording head configurations for use in recording in longitudinal tracks alongside the filmstrip edges but not in the image frame area.

The above-referenced patents showing magnetic recording heads along the edges of the filmstrip outside the image area generally teach providing pressure pad supports or rollers on the emulsion side opposite from the recording heads and continuous motion of the recording medium to ensure reliable recording. In the above-referenced '100 and '324 patents, various configurations for mounting a magnetic recording head in relation to the film transport path and film plane with the use of an oppositely disposed pressure rollers are disclosed in a camera.

In the above-referenced '780 patent, a different approach is taken wherein the recording head of the camera is positioned with respect to the chamber for receiving a modified film cartridge. The recording head bears against the MOF layer of a filmstrip exposed through an opening in the film cartridge lip. The film is supported and flattened within the lip, and the emulsion bears against a compliant support formed with a light blocking plush material overlying a lower flange of the cartridge lip.

The '780 patent also suggests that an elongated array of recording heads may be positioned to penetrate an elongated opening in the cartridge lip, relying on the plush as a backing support. The approach taken in the '780 patent requires the acceptance of a new film cartridge standard in the industry, and the use of plush material to block light entry through the opening.

None of the above-referenced patents specifically disclose magnetic recording head arrays (i.e., multi-head arrays) or any specific support structures for each magnetic recording head element for recording or reproducing in a plurality of tracks in the MOF layer on the side of the film opposite to the image frame area or support structures. Reading and recording information on tracks of a magnetic coating or stripes of magnetic coatings in the image frame area on photographic film in a still camera require solutions to problems different than those encountered in other magnetic media recording apparatus.

In a disk drive, the recording head flies or floats on the air film that is created as the nominally flat surface of the magnetic disk rotates at high speed on an actuator assembly as shown in U.S. Pat. No. 5,282,102, for example. The disk is not inherently curved or irregular as it rotates, and close recording head compliance can be attained. Pitch and roll of the magnetic recording head to follow minute irregularities in the magnetic disk surface is allowed by the configuration of the mount at the free end of the loading arm of the actuator assembly.

In a tape drive, the magnetic tape is flexible enough under tension to conform to the recording head contour both in the tape feed direction and in the cross-tape direction. Magnetic tape is quite thin and exhibits virtually no stiffness. And recording is done with the magnetic tape moving at a constant speed.

Photographic film, however, is of much greater thickness than the magnetic tape used for commercial and consumer recording and reproduction and is neither compliant nor inherently flat. When removed from its cartridge, a filmstrip shows a relatively high stiffness and very observable cross-curvature across its width that is convex on the non-emulsion side of the film. Further, the unwrapped filmstrip also shows a convex curvature along its length, again on the nonemulsion side of the film. This latter curvature is attributed primarily to a core-set curl that results from the filmstrip having been tightly wound on a film cartridge spool.

The cross-curvature across the width of the filmstrip is primarily caused by the number of multilayers of emulsion and MOF layer (if present). The emulsion multilayers (and MOF layer, if present) have different stretch properties than that of the base film substrate of acetate, PET, or PEN material. The cross-curvature is also influenced by the bending phenomena known as anticlastic curvature. The degree of filmstrip cross-curvature also depends on environmental conditions, including the time and temperature history of the film, the relative humidity, and the thickness of the film. Because of the cross-curvature, it is difficult to achieve good contact or compliance across the width of a wide, multi-head array. To provide a reliable read or write signal, the magnetic recording head must remain in close proximity to the magnetic coating. Any disturbances, such as variations in film curl, can vary the relationship of the recording head to the magnetic coating and decrease the reliability of the signal.

The space limitations in a portable hand held still camera, which necessarily must be as compact and light as possible to appeal to the average consumer, restrain the size and location of the magnetic recording head and the film drive system. In the cameras described in the above-referenced patents, the information is intended to be recorded in the MOF layer in the longitudinal tracks (defined by recording head spacing positions across the filmstrip) along the edge of or across the image area opposite to the exposed image frame, so that this information can be recombined with the image, even if the negatives are subsequently separated into individual image frames. Because of this requirement, the magnetic recording must take place downstream of the camera exposure gate area while the filmstrip is advanced to the next exposure. The exposure gate region in the camera where images are exposed is designed with film rails and a backing plate to confine and control the photographic filmstrip curvature to ensure that objects are optimally and uniformly focused by the camera lens across a given frame. The planarity of the film in other areas within the camera, specifically the downstream area, is not as carefully controlled. Thus, the filmstrip is susceptible to a greater degree of non-planarity associated with spooling, film cross-curvature, edge conditions, and other plastic deformations resulting from time, humidity, and temperature exposure described above.

The film motion during recording takes place in a frame stepping mode by means of a pulse of tension (i.e., jerking or jogging motion). When the pulse of tension is applied to a stationary filmstrip, the film tension conditions at the recording head/MOF layer interface are highly variable compounding the problems associated with the non-planarity and noncompliance of the filmstrip.

Of particular importance, the recording head-to-film interface must avoid scratching the MOF layer or the emulsion layers or the image quality will be degraded. The above-referenced patents related to the MOF layer on the filmstrip that show recording head structure are largely silent as to how to overcome these problems with recording in the image frame area. various approaches and solutions are set forth in the above-referenced co-pending applications.

The magnetic recording process requires that a recording head gap be in close proximity or contact with the magnetic media. Wide or non-uniform spacing separations between the recording head gap and the MOF layer result in lower recording density or a degraded signal. Maintaining a uniform contact or spacing of the recording head gaps with the MOF layer, without distorting the natural filmstrip curvature or the flatness of the filmstrip achieved in the exposure gate, is a challenge due to the films' non-planar nature and stiffness as described above.

Problems to be Solved by the Invention

The invention is directed to solving the above stated problems of recording and reproducing information on MOF layers in the image frame area of a filmstrip in a camera or in other filmstrip processing, handling or other apparatus while avoiding damage to the filmstrip in the image frame area.

SUMMARY OF THE INVENTION

It is therefore a primary object of the invention to enhance the compliance of a magnetic recording head with the MOF layer of a filmstrip for recording and/or reproducing information accurately in a plurality of tracks in the image area of the MOF layer without negatively affecting the quality of the photographic image.

It is a further object of the present invention to provide a system for suspending a multi-head array extending across the filmstrip in such a fashion that each recording head element compliantly follows the contour of the filmstrip to the extent that it exhibits cross curvature and exerts a uniform, low force against the MOF layer.

The invention is realized in a first aspect in a magnetic record/reproduce apparatus e.g. a photographic camera, for receiving an elongated filmstrip having a cross-film curvature and having a substantially transparent magnetic layer deposited on the film surface and for recording or reproducing information on or from the magnetic layer in relation to the exposure of image frames of the filmstrip comprising: means for defining an elongated filmstrip transport path having a backing plate on one side thereof and spaced apart film rails on the other side thereof for Guiding the filmstrip in the filmstrip transport path; means for advancing the filmstrip in a longitudinal direction in the filmstrip transport path from a filmstrip supply to a filmstrip takeup between the film rails and the backing plate past a camera image frame exposure aperture between the film rails with the filmstrip magnetic layer facing the backing plate and having a concave cross-film curvature near one side of the exposure aperture; and a magnetic record/reproduce multi-head array formed of a plurality of record/reproduce heads mounted on a like plurality of mounting platforms of flexure elements of a flexure support positioned to extend across and contact the magnetic layer at the side of the exposure aperture, the flexure elements providing loading force of the magnetic head elements with the filmstrip magnetic layer and providing pitch motion compliance with filmstrip motion in the film transport direction and roll motion compliance with the concave cross-film curvature.

Preferably, the plurality of flexure elements are each formed of a thin, resilient material into a cantilever spring member having a proximal end attached to the camera backing plate and the mounting platform at a distal end thereof. The spring member acts as a load beam and provides the head load penetration against the filmstrip magnetic layer to accommodate the convex cross-film curvature.

In a further aspect of the invention, the mounting platforms at the distal ends of the elongated, cantilever spring members have a gimbal mechanism formed therein for providing pitch and roll compliance of the mounted magnetic record/reproduce head with the filmstrip advancement motion and the concave cross-film curvature. The gimbal mechanism provides the capability for pitch motion of the mounted record/reproduce head to conform with changes in tension in the advancement of the filmstrip past the record/reproduce aperture in the film transport direction.

Preferably, each magnetic recording head is configured to exhibit a contoured profile in the film transport and cross-film directions for ensuring a high degree of compliance of the magnetic recording head with the magnetic layer of the filmstrip at the particular position without damaging the filmstrip.

In all embodiments, the magnetic record/reproduce heads are preferably magnetic recording heads but may be magnetic recording and reproducing heads and may for convenience be referred to in either case as magnetic recording heads or simply as a magnetic heads or recording heads.

The invention is preferably implemented within a camera where the filmstrip is transported through a camera exposure gate for exposing image frames in the photosensitive layers of the filmstrip on the opposite side of the filmstrip from the MOF layer. The invention may also be practiced in other filmstrip transport apparatus associated with film manufacture in order to pre-record information in certain tracks or in processing of the exposed filmstrips to develop the image frames or in making prints from the image frames in order to record further information in other tracks or for any other reason that it may prove useful to read information from or write information into the tracks and read or record information into selected tracks of the MOF layer.

Advantages of the Invention

In accordance with the present invention, and due to the various features thereof, a recording head-to-film interface in the film transport path that enables near-contact compliance over the width of multiple tracks, and over a large area around the individual magnetic recording head element gaps, is achieved. The head-to-film interface is operable over the broad range of film cross-curvatures that might be encountered. In addition, the invention provides a stable recording interface insensitive to the transient nature of film tension, while the film is advanced from frame to frame. Furthermore, the interface does not require emulsion side support, nor does it generate any significant surface damage to the MOF surface in the image frame area or alter the focal plane of the filmstrip in the camera exposure gate. In the context of photofinishing, the head-to-film interface is able to withstand, and recovers quickly from, disruptions caused by filmstrip splices attaching filmstrips together.

BRIEF DESCRIPTION OF THE DRAWINGS

These and other objects, advantages and features of the invention will become apparent from the detailed description given hereinafter in relation to the accompanying drawings, in which.

DETAILED DESCRIPTION OF THE PREFERRED EMBODIMENTS

Figure 1:
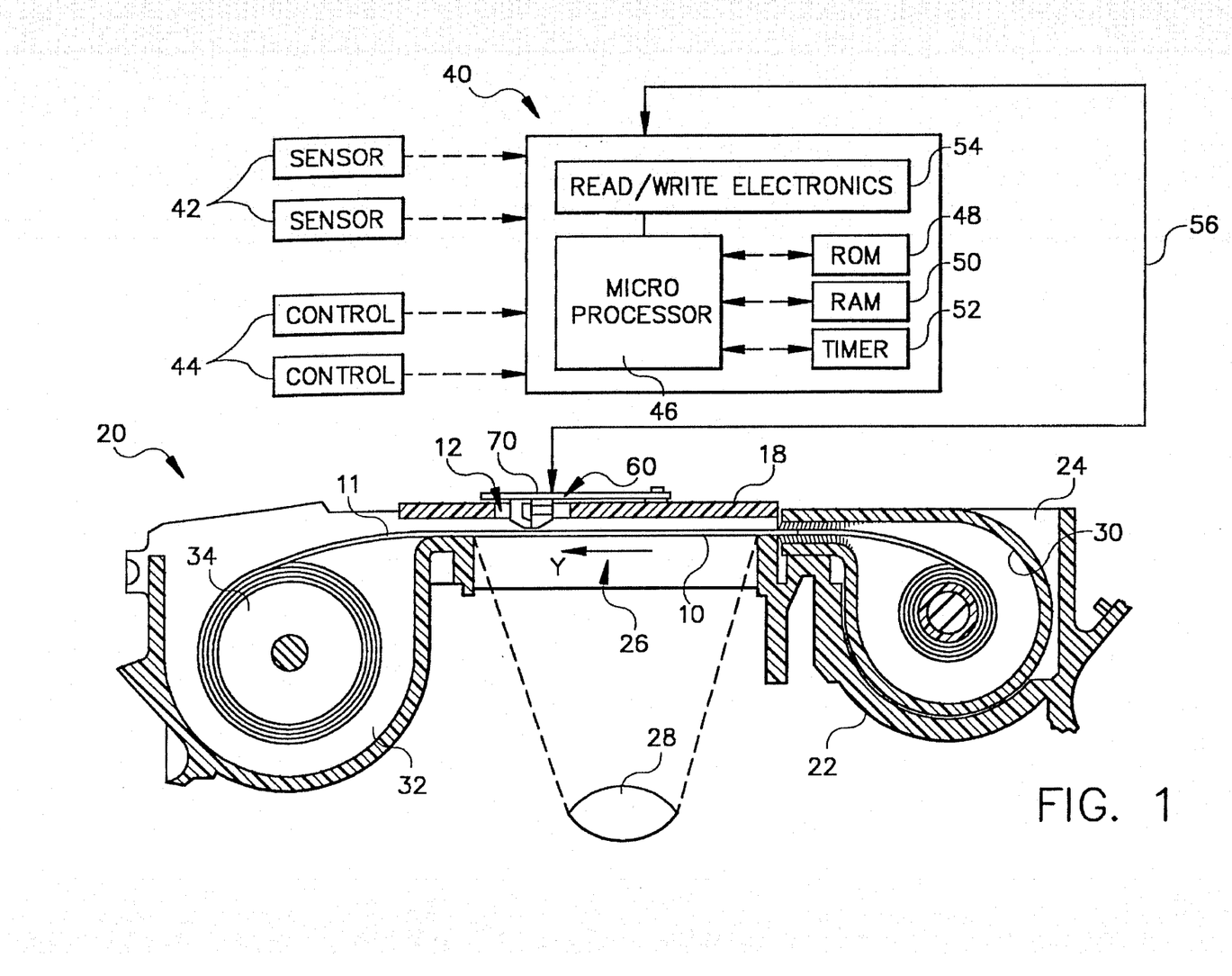
FIG. 1 is a schematic illustration of the components of a camera in which the present invention may be practiced.

The present invention preferably employs a photographic filmstrip of the type described in detail in the above-referenced '873 patent, for example, incorporated herein by reference, having the optically transparent MOF layer continuously coated on the non-emulsion side of the filmstrip base. A camera system for recording information into spaced parallel tracks in the MOF or magnetic layer 11 employing such a filmstrip 10 is depicted in FIG. 1 and may take the form depicted in the above-referenced '780 or '873 patents. FIG. 1 schematically illustrates any such camera, and features not necessary for an understanding of the present invention have been omitted or shown in block diagram to simplify the disclosure.

The schematically illustrated section of camera 20 comprises a frame or housing 22 having a chamber 24 at one end thereof for receiving a film cartridge 30. The cartridge 30 as depicted takes the form of a conventional 35 mm cartridge having a passive light lock through which the filmstrip 10 is withdrawn an image frame at a time for exposure and rewound after exposures are complete. The film cartridge may take the form of a "thrust" style cartridge with an active light lock, of the type disclosed in commonly assigned, U.S. Pat. No. 5,231,438, having a door through which the filmstrip 10 is advanced for exposure and rewound after all frames are exposed. In either case, as is well known in the art, the film cartridge 30 is inserted into the chamber 24 through the camera back or a film loading chamber door (not shown) so that when either is closed, the cartridge 30 is fixedly held in the orientation shown in FIG. 1. Since such camera and cartridge interface features are well known in the art, further description is deemed unnecessary.

From the cartridge 30, the filmstrip 10 is transported in a film transport path across a rectangular exposure gate opening 26 aligned with a camera taking lens 28, shutter and aperture etc., to a film take-up chamber 32 where it is wound on the take-up spool 34. Mechanisms for accomplishing such film transport are well known in the art. Typically, they operate to advance the filmstrip 10 an image frame at a time from the cartridge 30 to the take-up spool 34 after each image frame exposure.

All camera operations in advancing and rewinding the filmstrip and controlling the exposure of image frames, electronic flash illumination and the like are controlled by an electronic control system 40 which responds to sensor inputs 42 and camera controls 44. The electronic control system 40 is provided with a pre-programmed microprocessor 46 coupled with ROM 48 and RAM 50 and a timer 52. Other elements of the camera 20 include a conventional metering system for monitoring advance of the filmstrip, a shutter release mechanism (not shown), conventional automatic focus and exposure control systems (not shown), a conventional digital frame counter, as well as display and user interface switches (not shown) among the controls 44. These components are also all controlled from the electronic control system 40 by microprocessor 46 in a manner well known in the art of still cameras, and since they form no part of the present invention, further description is deemed unnecessary.

Microprocessor 46 also operates the read/write electronics block 54 to record in or read information from tracks in the MOF layer of the filmstrip during each advancement of the filmstrip 10 between the cartridge 30 and takeup chamber 32. The information to be recorded is described above and may include order related information to be magnetically recorded on the filmstrip 10 from the camera user through camera controls 44, such information pertaining to the number of prints desired for a given frame, by frame number, for example, or the name and address of the camera user for ultimate use by the photofinisher, or a title of the scene or event being photographed in any of the methods described in the above-referenced commonly assigned patents. The microprocessor 46 may also accept scene exposure related information from sensors 42 to be magnetically recorded on the filmstrip 10 for ultimate use by the photofinisher. Such information may include camera identification, orientation of the camera to the scene being photographed, scene luminance, aperture setting and shutter speed, and the like.

FIG. 1 also depicts a magnetic recording head 60 coupled to the read/write electronics block 54 through a signal line 56. While schematically depicted in an end view in FIG. 1, it will be understood from the following description that the magnetic recording head 60 is an array of discrete magnetic recording heads $62_1-62_n$ formed in a linear multi-head array in a manner to be described, and positioned in an elongated record/reproduce gap or opening 12 in the backing plate 18 to make contact with the magnetic layer 11 of the filmstrip 10. The backing plate 18 comprises a flat rectangular plate having planar dimensions complimentary with the rectangular exposure opening 26 and having the elongated record/reproduce opening 12 formed therein. Before describing the details of the magnetic recording head 60 and its suspension in the opening 12, reference is first made to FIG. 2.

Figure 2:
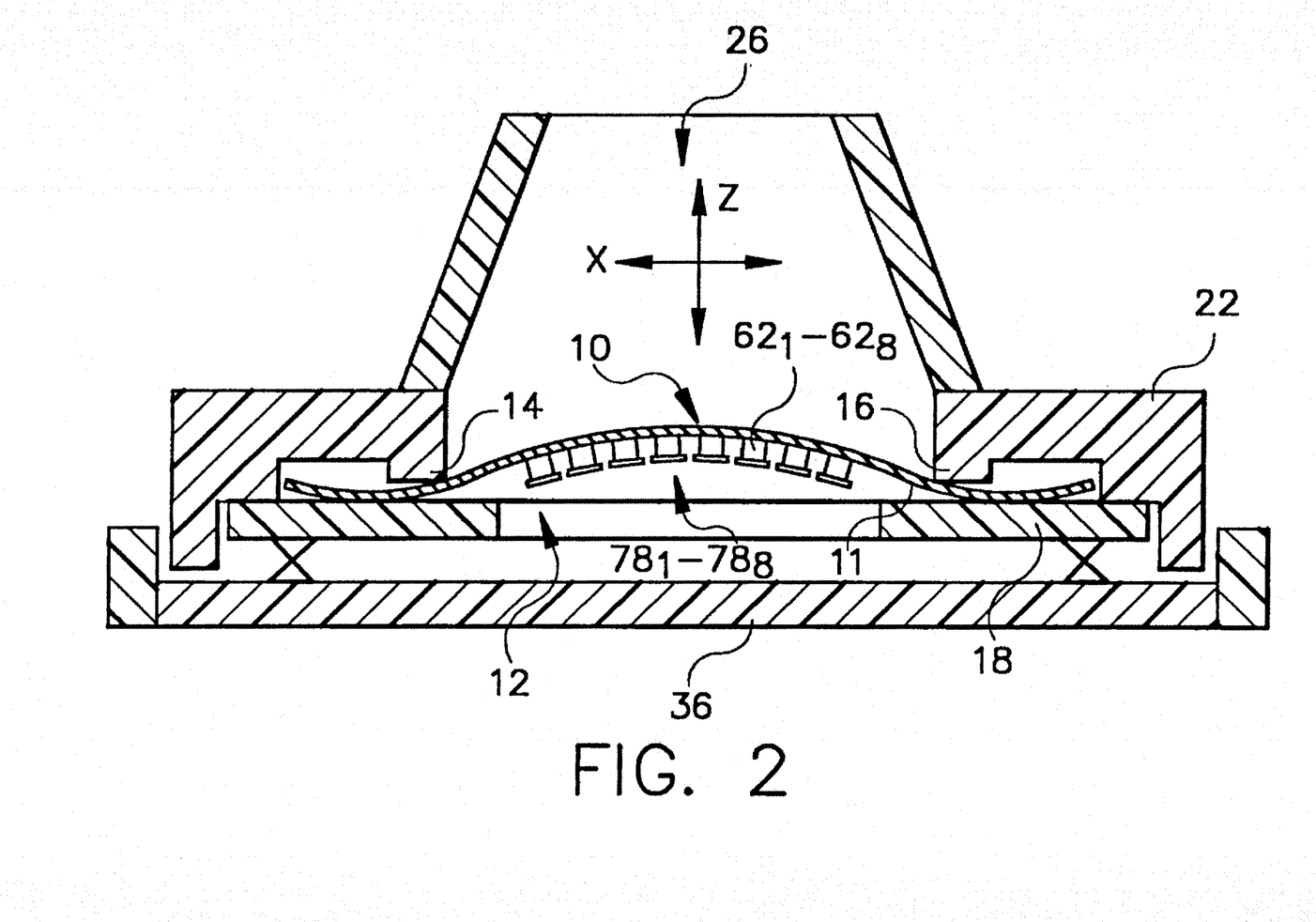
FIG. 2 is a partial cross-section view of the relationship of the film transport path and recording head suspension in the camera of FIG. 1.

FIG. 2 is an end cross-section view of the film transport path in the exposure gate 26 depicting in exaggerated fashion, the cross-film curvature or curl across the width of filmstrip 10 and the variable spacing of the filmstrip 10 from the backing plate 18 with filmstrip advance motion. FIG. 2 also schematically shows, again in exaggerated fashion, the necessary head deflection in the Z-direction and roll in the cross-film or X-direction to comply with the filmstrip magnetic layer 11.

The concave (as viewed from the magnetic layer 11) cross-film curl depicted in FIG. 2 is present when the filmstrip 10 is constrained longitudinally along its edges between a pair of film rails 14 and 16 formed in camera housing 22, extending along opposite sides of the rectangular exposure gate opening 26, and the backing plate 18. The filmstrip 10 is urged toward the rails by backing plate 18 mounted on a leaf spring on the camera back 36.

After loading the film cartridge 30 and directing the leading end of the filmstrip 10 into the take-up chamber 32, the camera back 36 or the film loading chamber 24 is closed. The spring loaded backing plate 18 urges the edges of the filmstrip 10 with slight pressure toward the rails 14, 16 as the filmstrip 10 is advanced through the film transport path. The constraining moment of force applied along the filmstrip side edges in the vicinity of the rails 14, 16 actually causes the free state convex (as viewed from the magnetic layer 11) cross-film curvature to be reversed to the concave cross-film curvature shown in FIG. 2.

More specifically, the filmstrip 10 is typically confined within a film transport gap from 150–300 μm. The backing plate 18 will tend to remove longitudinal curl resulting from film core set in the cartridge 30 and reverse the cross-film curvature across the filmstrip 10. Since the filmstrip 10 is unsupported transversely on its emulsion side, the depicted concave cross-film curl in the out-of-flatness tolerance range of 25–100 μm still exists during film exposure but not enough to noticeably degrade the image. The filmstrip 10 bows away from the backing plate 18 in the center of the camera exposure gate 26 and towards the backing plate 18 at the end of the camera exposure gate 26 by an amount dependent on the cross-curvature of the particular filmstrip.

In a typical still camera, the spacing between the backing plate 18 and the rails 14, 16 is in the range of 0.25–0.45 mm as a result of manufacturing tolerances. The photographic filmstrip 10 used in such a camera is typically 0.15 mm thick. Accordingly the filmstrip edges may not actually engage the rails 14, 16. Due to the transverse film curl, the extreme edges of the filmstrip 10 may actually engage camera frame surfaces outside the rails 14, 16 with the curl bias causing most of the width of the filmstrip 10 to engage the backing plate 18. Because of this result, the camera lens 28 is typically focused on a film plane next to the backing plate 18.

As mentioned above, the degree of concave cross-film curl is greatly exaggerated in FIG. 2. However, it will be understood that even the small cross-film curvature causes loss of compliance with the individual recording heads if the elements are arrayed in a rigid, straight support and the gaps that occur degrades performance. Moreover, the edges of the individual recording heads can scratch the filmstrip magnetic layer 11.

Moreover, the start-stop acceleration and deceleration jerkiness of the filmstrip advance motion described above combined with the cross-film curl and film stiffness characteristics of the filmstrip 10 also cause uneven variations in instantaneous cross-film curvature and distance between the MOF layer of the filmstrip 10 and the backing plate 18 shown in the example of FIG. 2. This translates into instantaneous changes in forces applied by the filmstrip 10 on the recording heads and changes in the recording head/MOF layer compliance.

The present invention involves the realization that a high degree of compliance and recording head performance can be attained during static and dynamic conditions without the use of a backing support contacting the emulsion side of the filmstrip 10 and that the recording heads can be positioned in the exposure gate area 26 where the cross-film curvature is concave on the MOF layer side as shown in FIG. 2.

Figure 3:
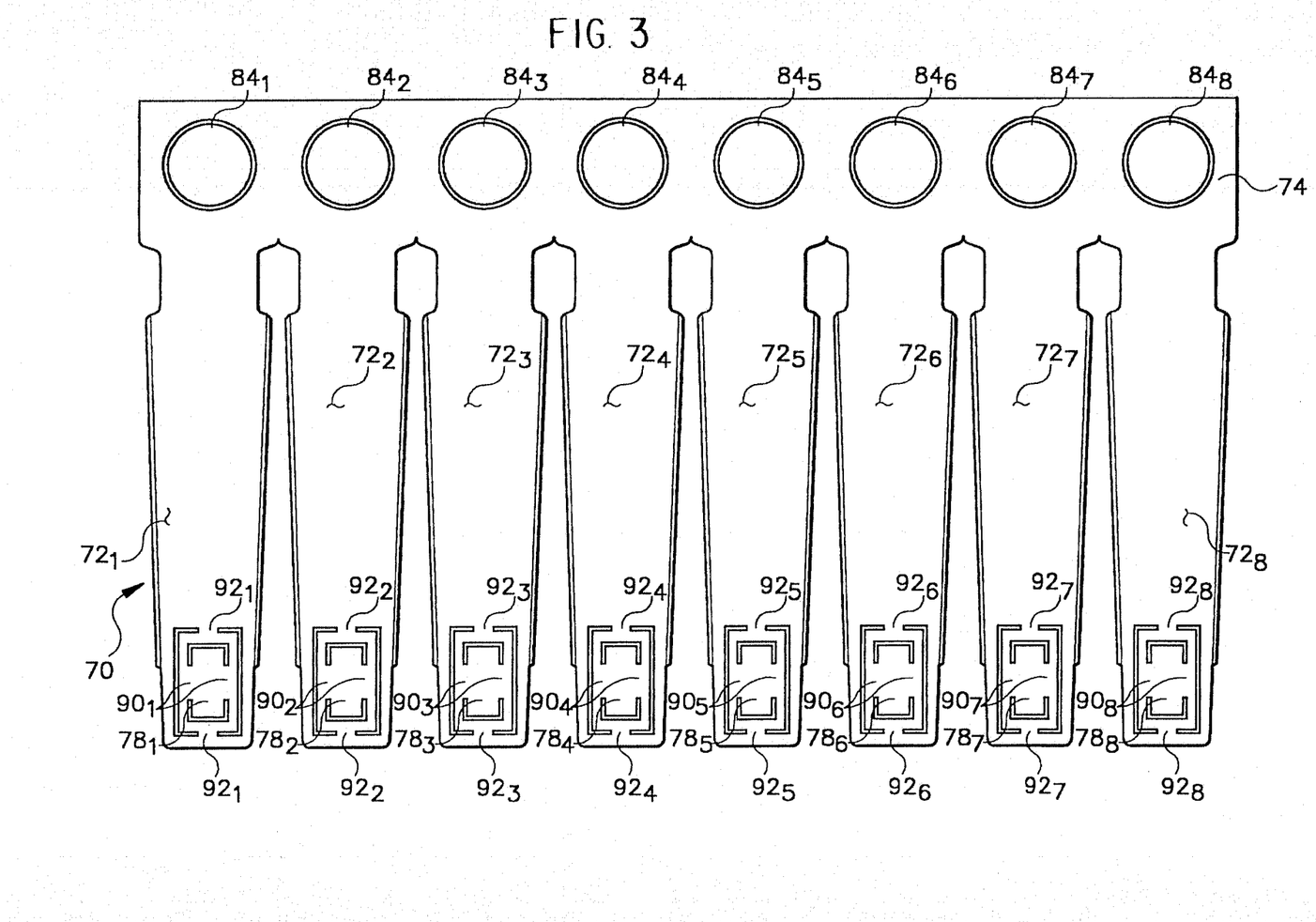
FIG. 3 is a plan view of an elongated flexure support for individually suspending magnetic recording heads in relation to the MOF layer of a filmstrip in the camera of FIG. 1.
Figure 4:
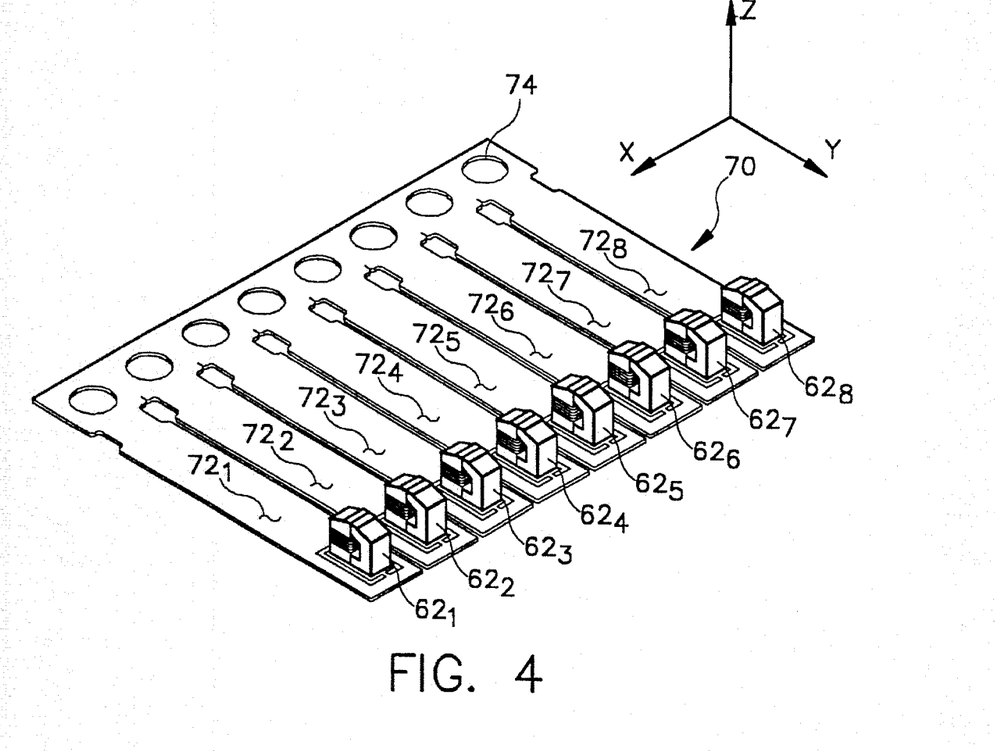
FIG. 4 is a perspective view of a further elongated flexure support having magnetic recording heads mounted thereon.

Returning to FIG. 1, the unitary flexure support 70 is depicted suspending the magnetic recording head 60 in the elongated record/reproduce opening 12 extending along the side of the exposure gate 26 adjacent to the takeup chamber 32. FIG. 3 shows an elongated unitary flexure support 70 having n=8 separated suspension flexure load beams $72_1-72_8$ extending from an elongated attachment plate 74. The recording heads $62_1-62_8$ are attached on the separate suspension flexure load beams $72_1-72_8$ of the unitary flexure support 70 as shown in FIG. 4.

The round holes $84_1-84_8$ in mounting plate 74 are intended to receive swages or other attaching mechanisms to fixedly attach and stabilize the mounting plate 74 to one side of the backing plate 18 as shown in FIG. 1, for example. Of course, the mounting plate 74 may be attached in any fashion to either side the backing plate 18 along one side the opening 12. The attachment plate 74 is in this fashion attached in FIG. 1 to the backing plate 18, and the flexure load beams $72_1-72_8$ extend through the elongated opening 12 so that the recording heads $62_1-62_8$ can individually penetrate in the Z- direction of FIG. 2 sufficiently to make contact with the concavely bowed, filmstrip magnetic layer 11.

The elongated unitary flexure support 70 is made from a single piece of flexure material, typically stainless steel, which is stamped from one piece into the pattern of the individual flexure load beams $72_1-72_8$ depicted. Preferably, the flexure support 70 is stamped, etched, and formed from a single uniform thickness sheet of yieldable metal between 80–120 μm thick. The flexure load beams $72_1-72_8$ are preferably reinforced with stiffening edge rails. The formed bending areas in the vicinity of the attachments of the flexure load beams $72_1$–$72_8$ with the mounting plate 74 are relieved by heat treatment to minimize the load loss that results when the flexure load beams $72_1$–$72_8$ are allowed to stay in the loaded position for an extended time period.

The construction of the unitary flexure support 70 as depicted and described provides the flexure elements $72_1$–$72_8$ as low profile cantilever springs to provide Z-direction deflection motion. After mounting on the mounting plates of the flexure support 70, the recording head element heights in the Z-direction extending beyond the interior surface plane of the backing plate 18 ranges, with the cross-film concave curvature, from 50–125 μm.

Each flexure element $72_1$–$72_8$ supports a magnetic recording head element $62_1$–$62_8$ adhered to the mounting platforms $78_1$–$78_8$. FIG. 4 shows a multi-head array 70 of eight recording heads $62_1$–$62_8$ mounted on $78_1$–$78_8$ mounting platforms at the distal ends of the respective flexure load beams $72_1$–$72_8$. Recording head wiring (not shown) extending from each such recording head is adhered to and extends along the length of each flexure load beam $72_1$–$72_8$ between the side rails and is attached to the signal line 56 of FIG. 1.

The mounting platforms $78_1$–$78_8$ are formed at the distal ends of the load beam $72_1$–$72_8$ within the cut-outs shown in FIG. 3. The sets of webs $90_1$–$90_8$ and $92_1$–$92_8$ support the mounting platforms $78_1$–$78_8$ and form gimbal mechanisms. Individual roll and pitch motion of each of the distal mounting platforms $78_1$–$78_8$, and the respective magnetic recording heads $62_1$–$62_8$ attached thereto, is allowed by the gimbal mechanisms in response to the uneven pressures exerted by the filmstrip 10 on each recording head element $62_1$–$62_8$.

The roll motion is achieved by twisting motion of the mounting platforms $78_1$–$78_8$ on the sets of webs $92_1$–$92_8$ in the X-direction. The pitch motion is achieved by the bending of the mounting platforms $78_1$–$78_8$ on the sets of webs $90_1$–$90_8$ in the Y-direction in response to film motion tension changes in the Y-direction of FIG. 4.

The thickness of the flexure support stamping and the width of the webs $90_1$–$90_8$ and $92_1$–$92_8$ are the dominant factors in determining the pitch and roll torsional stiffnesses. The flexure stiffness in the roll change or X-direction provided by the gimbal mechanism is in the range of 5–30 μNm/deg, where the penetration load is in the range of 0.02–0.10N with a spring constant less than 30 μN/m. The flexure stiffness of the gimbal mechanism in the pitch change or Y-direction is in the range of 75–150 μNm/deg where the penetration load is in the range of 0.02–0.10N with a spring constant less than 30 N/m.

These measurements were made utilizing an inertia method employing a photonic probe sensing the light reflected from the surface of a block of known mass attached to the mounting platforms $78_1$–$78_8$ and freely oscillating. From the known mass and measurements of the natural frequency of oscillation in each direction, the stiffnesses in the pitch and roll directions may be calculated.

Figure 5:
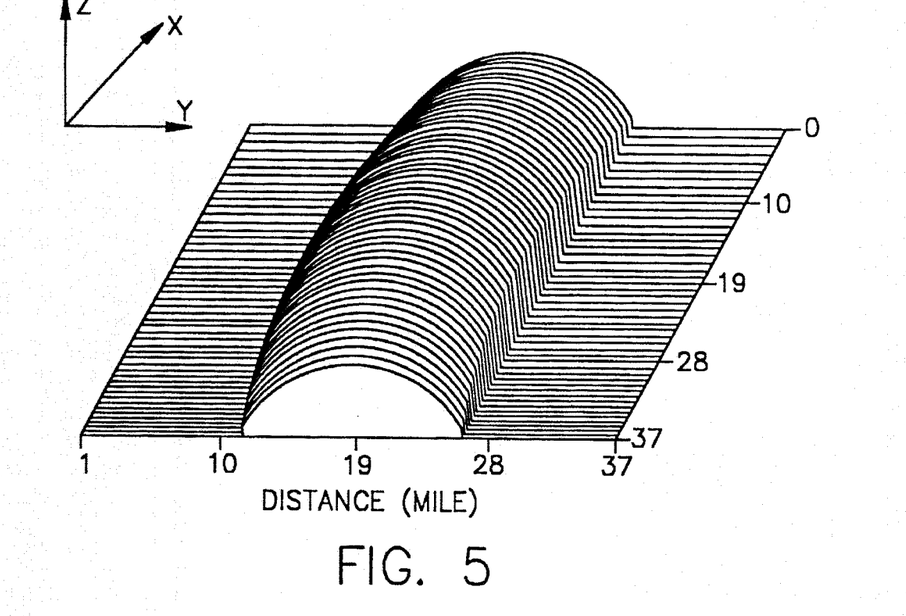
FIG. 5 is a topological drawing of the profile of a recording head element suitable for use in the present invention.

In all of the above embodiments, it is desirable that the individual heads $62_1$–$62_n$ be shaped with prolate ellipsoid surfaces that contact the MOF layer so that there are no sharp edges in the cross-film, roll change, X-direction or longitudinal, pitch change, Y-direction. These edges of each recording head may be blended into the sides of the recording heads by lapping or polishing. The resulting head profile is bi-directionally crowned in a manner shown in the computer drawn topological illustration of a lapped recording head element of FIG. 5. This shaping provides a sliding surface against the MOF layer of the filmstrip 10 in the positions of the individual heads $62_1$–$62_8$ as shown in FIG. 2.

The radii of curvature of the sliding surface may be determined by the ratio $1.7 < R_x R_y < 16.0$ where $R_x$ and $R_y$ are the radii of curvature in the X-direction and Y-direction, respectively. The width of each recording head element 62 in the X-direction is from 0.3–1.0 mm, and the length of each recording head element 62 in the Y-direction is from 0.7–2.0 mm. The edges of the sliding surface of each recording head element 62 is blended by lapping or polishing to a minimum radius of 0.25 mm.

Figures 6, 7:
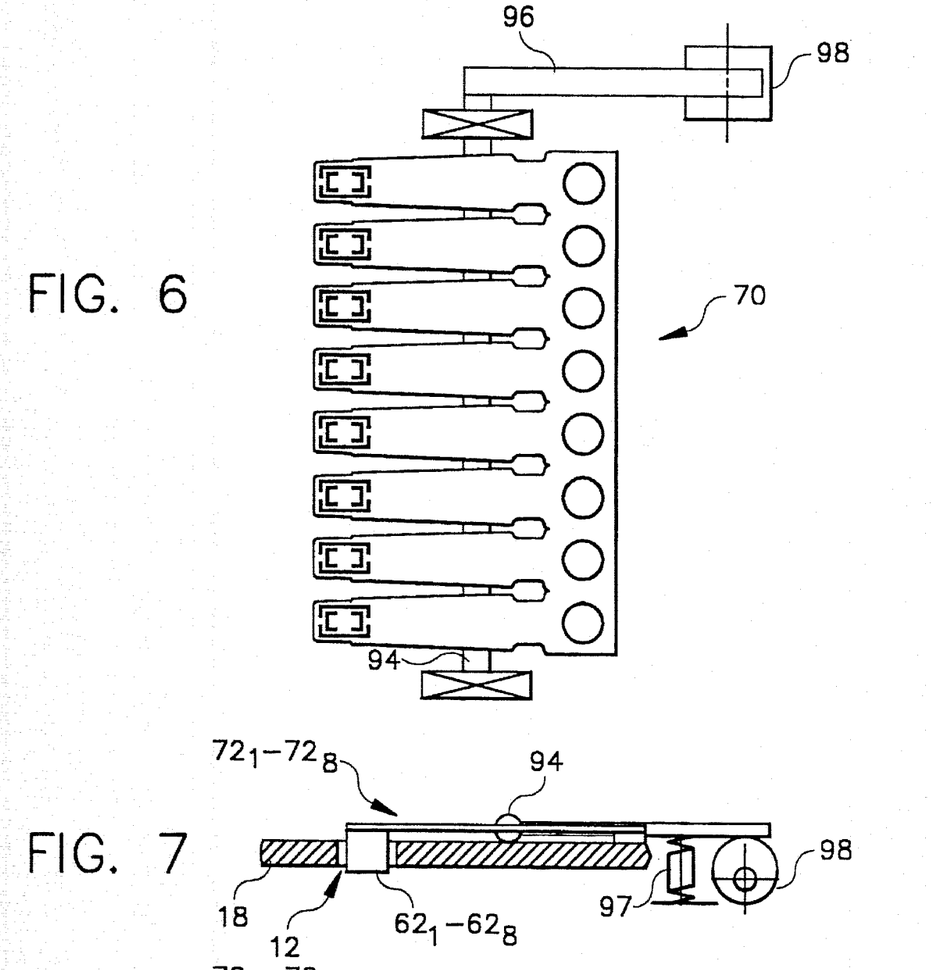
FIGS. 6–8 illustrate a mechanism for mounting the elongated flexure support of FIGS. 3 and 4 for suspending magnetic recording heads in relation to the MOF layer of a filmstrip in the camera of FIG. 1 and for retraction from the MOF layer when the camera is not in use.
Figure 8:
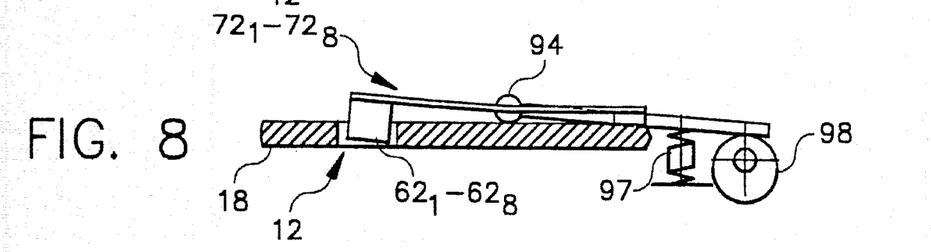

Turning to FIGS. 6–8, they illustrate a mechanism for mounting the elongated flexure support 70 of FIGS. 3 and 4 for suspending magnetic recording heads in relation to the filmstrip magnetic layer 11 in the camera of FIG. 1 when the camera is being used and for retraction of the magnetic heads from the magnetic layer 11 when the camera is not in use for a certain time period. Despite the light pressure exerted by the multi-head array on the magnetic layer, there is a possibility, that prolonged contact over weeks or months with the filmstrip 10 left in the camera could cause pressure set deformation "bumps" at the points of contact. Therefore it is contemplated that the inactivity of the electronic control system for a period of time or the absence of a filmstrip 10 in the film transport path would be detected by the microprocessor and the elongated flexure support 70 would be retracted.

In FIG. 6, the flexure support 70 is shown in relation to a movable deflector bar 94 extending between the flexure load beams $72_1$–$72_8$ and the camera backing plate 18. The deflector bar 94 is attached to a beam 96 that is spring loaded by spring 97 to rest against an eccentric or cam 98 that can be rotated by a signal from the microprocessor 46 between the positions of FIGS. 7 and 8. In the active position of FIG. 7, the deflector bar 94 does not interfere with the flexure load beams $72_1$–$72_8$, and the magnetic recording heads $62_1$–$62_n$ are free to penetrate in the Z-direction through the record/reproduce opening 12 into contact with the filmstrip magnetic layer 11 as described above. In the inactive position of FIG. 8, the cam 98 is rotated, and the beam 96 drops, thereby raising the distal ends and attached magnetic recording heads $62_1$–$62_n$ out of engagement with the filmstrip magnetic layer 11.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–8 filmstrip 10
magnetic layer 11
elongated opening 12
film rails 14, 16
backing plate 18
camera 20
housing 22
chamber 24
exposure gate opening 26
camera taking lens 28 film cartridge 30
film take-up chamber 32
take-up spool 34
camera back 36
electronic control system 40
sensor inputs 42
camera controls 44
microprocessor 46
ROM 48
RAM 50
timer 52
signal line 56
magnetic recording head 60
multi-head array of magnetic recording heads $62_1$–$62_n$
flexure support 70
flexure load beams $72_1$–$72_n$
elongated mounting plate 74
mounting platforms $78_1$–$78_{10}$
round holes $84_1$–$84_{10}$
sets of webs $90_1$–$90_n$
sets of webs $92_1$–$92_n$
deflector 94
beam 96
spring 97
eccentric or cam 98

What is claimed is:

1. Magnetic record/reproduce apparatus for recording and/or reproducing information in relation to image frame areas of a photographic filmstrip in a substantially transparent magnetic layer on a surface of the photographic filmstrip, said filmstrip having a cross-film curvature across the width thereof, said apparatus comprising:

means for defining an elongated filmstrip transport path having a backing plate with a record/reproduce aperture therein extending across the width of said filmstrip on one side of the filmstrip transport path;

means for advancing said filmstrip in a film transport direction in said filmstrip transport path from a filmstrip supply to a filmstrip takeup and past said record/reproduce aperture, whereby said filmstrip advanced across said aperture exhibits cross-film curvature;

a plurality of magnetic record/reproduce heads adapted to be suspended with respect to said record/reproduce aperture to extend across said filmstrip in a spaced apart array for recording and/or reproducing information in tracks in said magnetic layer, said tracks extending in said film transport direction and across said image frame areas; and suspension means having a like plurality of flexure elements corresponding to said plurality of magnetic record/reproduce heads, such that one of said flexure elements suspends a corresponding one of said plurality of magnetic record/reproduce heads in said array within said record/reproduce aperture in loading contact compliance with said cross-film curvature of said filmstrip magnetic layer, each flexure element having a mounting platform for mounting a magnetic record/reproduce head and a movable flexure load beam attached at one end thereto and extending from said backing plate into said record/reproduce aperture and toward said filmstrip magnetic layer to provide loading force through said magnetic record/reproduce head against said magnetic layer, said mounting platform having means for allowing pitch and roll motion of said magnetic record/reproduce head to conform with said cross-film curvature across the contact width of said record/reproduce heads with said magnetic layer.

2. The apparatus of claim 1 wherein said magnetic record/reproduce heads are shaped with a contoured profile in said cross-film direction for ensuring compliance with the filmstrip magnetic layer during roll motion of the magnetic record/reproduce head to conform with said cross-film curvature without causing damage to the filmstrip.

3. The apparatus of claim 2 wherein said magnetic record/reproduce heads are shaped with a contoured profile in said film transport direction for ensuring compliance with the filmstrip magnetic layer during pitch motion of the magnetic record/reproduce head to conform with changes in filmstrip advancement tension without causing damage to the filmstrip.

4. The apparatus of claim 1 wherein said movable flexure load beam and said mounting platform of each of said flexure elements is formed of a thin, resilient material into a cantilever spring member having said mounting platform at a distal end thereof providing the mounted magnetic record/reproduce head with the capability for advancing the individual record/reproduce heads varying distances into contact against the filmstrip magnetic layer whereby said means for allowing roll motion can conform said record/reproduce heads with said cross-film curvature.

5. The apparatus of claim 4 wherein said magnetic record/reproduce heads are shaped with a contoured profile in said cross-film direction for ensuring compliance with the filmstrip magnetic layer during roll motion of the magnetic record/reproduce head to conform with said cross-film curvature without causing damage to the filmstrip.

6. The apparatus of claim 5 wherein said magnetic record/reproduce heads are shaped with a contoured profile in said film transport direction for ensuring compliance with the filmstrip magnetic layer during pitch motion of the magnetic record/reproduce head to conform with changes in filmstrip advancement tension without causing damage to the filmstrip.

7. A photographic still camera for receiving an elongated filmstrip having a cross-film curvature and having a substantially transparent magnetic layer deposited on the film surface and for recording or reproducing information on or from the magnetic layer in relation to the exposure of image frames of the filmstrip comprising:

means for defining an elongated filmstrip transport path having a backing plate on one side thereof and spaced apart film rails on the other side thereof for guiding said filmstrip in said filmstrip transport path;

means for advancing said filmstrip in a film advance direction in said filmstrip transport path from a filmstrip supply to a filmstrip takeup between said film rails and said backing plate past a camera image frame exposure gate aperture between said film rails with said filmstrip magnetic layer facing said backing plate and having a concave cross-film curvature as viewed from said magnetic layer;

a magnetic record/reproduce multi-head array formed of a plurality of record/reproduce heads;

a flexure support for said multi-head array comprising a like plurality of mounting platforms of individual flexure elements of said flexure support for supporting said plurality of record/reproduce heads;

means for positioning said flexure support to extend said flexure elements across said filmstrip and position said plurality of record/reproduce heads in contact with said magnetic layer within said exposure gate aperture, said flexure elements providing a loading force through said magnetic record/reproduce heads against said filmstrip magnetic layer and said mounting platforms providing pitch motion compliance with filmstrip motion changes in the advancement direction and roll motion compliance with said concave cross-film curvature across the contact width of said record/reproduce heads with said filmstrip magnetic layer.

8. The apparatus of claim 7 wherein:

said flexure elements are each formed of a thin, resilient material into a cantilever spring member having a proximal end attached to said camera backing plate and said mounting platform at a distal end thereof; and each said mounting platform provides the mounted magnetic record/reproduce head with the capability for pitch motion to conform with changes in tension in the advancement of said filmstrip past said record/reproduce aperture in said film transport direction.

9. The camera of claim 8 wherein each of said mounting platforms at said distal ends of said elongated, cantilever spring members have a gimbal mechanism formed therein for providing pitch and roll compliance with said filmstrip advancement motion and said concave cross-film curvature.

10. The camera of claim 7 wherein said flexure elements each further comprise an elongated, cantilever spring having a proximal end attached to said camera backing plate and a distal end terminating in said mounting platform having a gimbal mechanism formed therein for providing pitch and roll compliance with said filmstrip advancement motion and said concave cross-film curvature.

11. The camera of claim 8 wherein:

said camera backing plate is formed with a record/reproduce aperture extending between said film rails along one side edge of said camera image frame exposure gate; and said flexure elements are attached at said proximal ends of said cantilever spring members to said backing plate alongside said record/reproduce aperture such that said mounting plates at said distal ends of said cantilever springs extend into said record/reproduce aperture to position said magnetic record/reproduce heads in said array and against said concave cross-film curvature of said filmstrip magnetic layer with a predetermined loading force.

12. The camera of claim 7 wherein each of said flexure elements is formed of a thin, resilient material into a cantilever spring member having said mounting platform at a distal end thereof providing a flexure load beam with the capability for advancing the individual record/reproduce heads varying distances into contact against said concave cross-film curvature of said filmstrip magnetic layer with a predetermined loading force.

13. The camera of claim 12 wherein each of said mounting platforms at said distal ends of said elongated, cantilever spring members have a gimbal mechanism formed therein for providing pitch and roll compliance with said filmstrip advancement motion and said concave cross-film curvature.

14. The camera of claim 7, wherein said magnetic record/reproduce heads are shaped with a contoured profile in said cross-film direction for ensuring compliance with the filmstrip magnetic layer during roll motion of the magnetic record/reproduce head to conform with said cross-film curvature without causing damage to the filmstrip.

15. The camera of claim 7 wherein said magnetic record/reproduce heads are shaped with a contoured profile in said film transport direction for ensuring compliance with the filmstrip magnetic layer during pitch motion of the magnetic record/reproduce head to conform with changes in filmstrip advancement tension causing damage to the filmstrip.

16. The camera of claim 7 wherein said magnetic record/reproduce heads are shaped with contoured profiles in the cross-film and film transport directions for ensuring compliance with said filmstrip magnetic layer during roll and pitch motions of the magnetic record/reproduce head without causing damage to the filmstrip.

* * * * *